Nov. 3, 1942.   M. P. ROBINSON   2,300,633

PROPORTIONING APPARATUS

Filed Sept. 6, 1941

Merrill P. Robinson,
INVENTOR

BY *Rob Meyer*

ATTORNEY

Patented Nov. 3, 1942

2,300,633

UNITED STATES PATENT OFFICE 2,300,633

PROPORTIONING APPARATUS

Merrill P. Robinson, Upper Montclair, N. J., assignor to Worthington Pump and Machinery Corporation, Harrison, N. J., a corporation of Delaware Application September 6, 1941, Serial No. 409,777

6 Claims. (Cl. 137—165)

This invention relates to proportioning apparatus, and more particularly to means operable by the flow of fluid through a conduit for controlling the flow of a secondary fluid.

An object of the present invention is to provide an apparatus of this type which is comparatively simple in construction and will proportion the flow of a secondary fluid to the main fluid flow to maintain proper proportionate flow of the fluids under variations in the main fluid flow.

The invention relates to apparatus employed in the treating of water, and specifically to means for proportioning the chemical reagent employed in treating the water with the water flowing to the treating tank or apparatus, utilizing a Venturi tube as a pressure difference producing apparatus or means in the water flowing to the treating tank. According to Venturi's law, fluids in passing through pipe portions with radially converging sides lose head or pressure and gain velocity, and in passing through pipe portions with radially diverging sides gain head or pressure and lose velocity. The present invention utilizes a standard Venturi tube, through which the main fluid flow passes, and means operated by the pressure difference produced in the flow through the Venturi tube, which pressure differences vary with variances in the flow of water or fluid, to control the flow of the chemical reagent and proportion it to the quantity of water flow to the water treating apparatus.

With these and other objects in view, as may appear from the accompanying specification, the invention consists of various features of construction and combination of parts, which will be first described in connection with the accompanying drawing, showing a proportioning apparatus of the preferred form embodying the invention, and the features forming the invention will be specifically pointed out in the claims.

Figure 1:
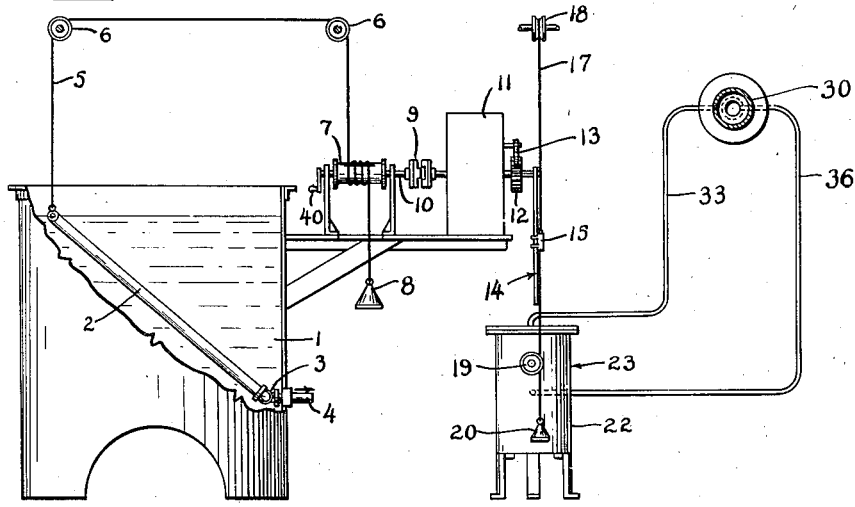
Figure 1 is a diagrammatic side elevation, partly in section, of the improved proportioning apparatus.
Figure 2:
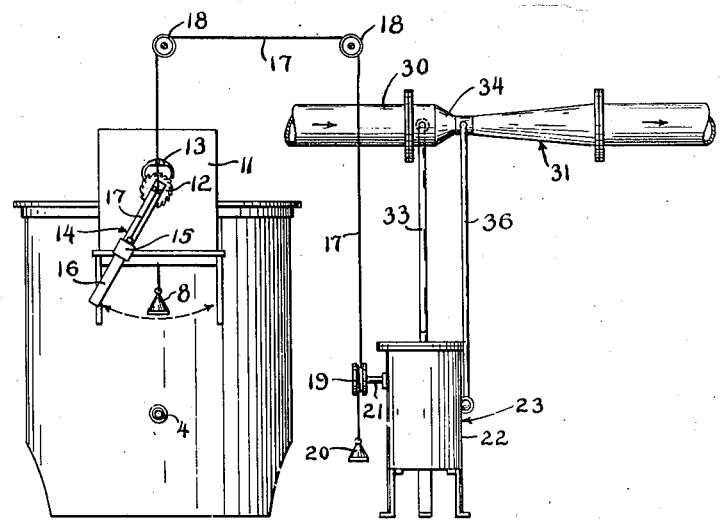
Figure 2 is a diagrammatic side elevation, partly in section, of the improved proportioning apparatus, taken at right angles to the view shown in Figure 1.
Figure 3:
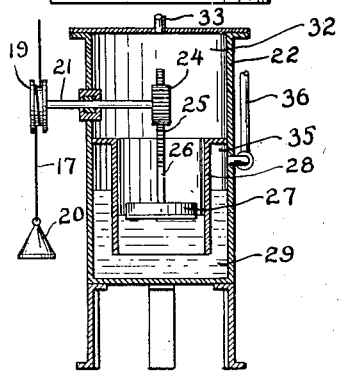
Figure 3 is a cross-section of the pressure actuated structure employed in the proportioning apparatus.

Referring more particularly to the drawing, 1 indicates a chemical supply tank from which the chemical used in the water treating apparatus (not shown) is delivered. A decanting tube 2 is pivotally supported, as shown at 3, within the tank 1 and is connected to the chemical outlet 4. The upper inlet end of the decanting tube 2 is positioned at a skimming level with the level of the chemical solution within the tank 1 so that it will skim the solution from the top and decant it from the tank 1 for use.

The decanting tube 2 has a cord, wire or the like, 5, connected thereto at its upper end, which is guided by suitable guiding pulleys 6, and is wound about a drum 7, having a weight 8 attached to its free end opposite to the end connected to the decanting tube 2. The drum 7 is connected by a suitable releasable clutch structure 9 to a shaft 10, which is in turn connected through a gear train 11 to an escapement wheel 12, which cooperates with the escapement 13. A pendulum 14 is connected to the escapement wheel 12 for rotating the wheel in step by step movement with the swinging of the pendulum. The pendulum weight 15 is slidably mounted upon the pendulum stock or stem 16 and has a cord, wire or other flexible member 17 connected thereto which passes over suitable guide pulleys 18 and is wound about a drum 19, being held tensioned upon the drum by a weight 20. The drum 19 is mounted upon and rotates with a shaft 21, which shaft extends into the casing 22 of the pressure actuated structure 23.

The shaft 21 has a pinion 24 thereon, which meshes with a rack 25. The rack 25 is formed upon a rod or stem 26, attached to and movable with a float 27. The interior of the casing 22 is divided into two separate pressure chambers by a cylindrical partition 28 and a quantity of mercury indicated at 29. The float 27 floats upon the mercury 29 in the inner pressure chamber.

The flow of the main fluid or water is through a suitable conduit or pipe 30 and a Venturi tube 31, of approved construction, is placed in the conduit 30 so that the main flow of water or flow of the main fluid will be through the Venturi 31. The pressure chamber 32 within the casing 22, in which the float 27 is positioned, is connected by a suitable conduit 33 with the Venturi tube 31 at its entrance, and in advance of its converging portion 34, while the chamber 35, which is positioned about the chamber 32, is connected by a suitable pipe 36 to the Venturi tube at the outlet end of the converging portion 34. The partition 28 provides substantially a cylindrical mercury U tube effect, with the level of the mercury in the two chambers varying with the variations in pressure difference in the Venturi tube 31, so that the float 27 will move with the variations in the level of the mercury in the chamber 32. Such movement of the float 27 will rotate the shaft 21, through the medium of the rack 25 and pinion 24, which will rotate the drum 19, move the cord 17 and move the weight 15 along the stock 16 of the pendulum 14, consequently varying the speed of oscillation of the pendulum in direct proportion to the variances in the pressure difference in the Venturi tube 31, and consequently, in direct proportion to the variances in the quantity of water or other fluid flowing through the conduit 30.

The variations in speed of the swinging movement of the pendulum 14 will vary the speed of rotation of the escapement gear 12 and consequently vary the speed of rotation of the drum 7. The variation in the speed of rotation of the drum 7 will in turn vary the speed of the lowering movement of the inlet end of the decanting tube 2 and consequently vary the speed of discharge of chemical from the tank 1. Thus, the discharge of chemical from the tank 1 will be in direct proportion to the quantity of water or other fluid flowing through the conduit 30.

After the tank 1 is emptied, the clutch 9 is disconnected and the drum 7 is manually rotated, as by means of the handle 40, to move the inlet end of the decanting tube 2 to its uppermost position within the tank 1, and the tank is then refilled.

It will be understood that the invention is not to be limited to the specific construction or arrangement of parts shown, but that they may be widely modified within the invention defined by the claims.

What is claimed is:

1. In a proportioning system, the combination with a conduit through which a main fluid flows and a pressure differential producer in said conduit, of a reagent container, a movable decanting tube having its inlet in said container in skimming relation with the level of reagent in the container, an oscillating pendulum, means actuated by the oscillation of said pendulum for moving said tube to control the decanting of the reagent from said container, and means operated by pressure differences produced in said differential producer for varying the speed of oscillation of the pendulum to regulate the lowering of said decanting tube in accordance with pressure differences produced in the pressure differential producer.

2. In a proportioning system, the combination with a conduit through which a main fluid flows and a pressure differential producer in said conduit, of a reagent container, a movable decanting tube having its inlet in said container in skimming relation with the level of reagent in the container, an oscillating pendulum, means actuated by the oscillation of said pendulum for moving said tube downwardly to control the decanting of the reagent from said container, said pendulum including an adjustable weight, and means operated by pressure differences produced in said differential producer for moving said weight to control the speed of oscillation of the pendulum and the speed of downward movement of the decanting tube.

3. In a proportioning system, the combination with a conduit through which a main fluid flows and a pressure differential producer in said conduit, of a reagent container, a decanting tube pivotally mounted within said container and having its inlet in skimming relation with the level of reagent in the container, an oscillating pendulum, means actuated by oscillation of the pendulum for swinging said tube on its pivot to lower its inlet to control the decanting of the reagent from the container, and means operated by pressure differences produced in said differential producer for controlling speed of oscillation of said pendulum.

4. In a proportioning system, the combination with a conduit through which a main fluid flows and a pressure differential producer in said conduit, of a reagent container, a decanting tube pivotally mounted within said container and having its inlet in skimming relation with the level of reagent in the container, an oscillating pendulum, means actuated by oscillation of the pendulum for swinging said tube on its pivot to lower its inlet to control the decanting of the reagent from the container, said pendulum including an adjustable weight, and means operated by pressure differences produced in said differential producer for moving said weight to various positions with respect to the pivot of the pendulum to control the speed of oscillation of the pendulum.

5. In a proportioning system, the combination with a conduit through which a main fluid flows, and a pressure differential producer in said conduit, of a reagent container, a decanting tube in said container having its inlet in skimming relation with the level of reagent in the container, an oscillating pendulum, means actuated by oscillation of said pendulum for lowering the inlet of said decanting tube, an escapement mechanism between said pendulum and tube lowering means whereby the speed of oscillation of the pendulum will control the speed of lowering of the inlet of the decanting tube, and means operated by pressure differences produced in said differential producer for varying the speed of oscillation of the pendulum to regulate the speed of lowering of the inlet of said decanting tube in accordance with pressure differences produced in the pressure differential producer.

6. In a proportioning system, the combination with a conduit through which a main fluid flows, and a pressure differential producer in said conduit, of a reagent container, a decanting tube in said container having its inlet in skimming relation with the level of reagent in the container, an oscillating pendulum, means actuated by oscillation of said pendulum for lowering the inlet of said decanting tube, an escapement mechanism between said pendulum and tube lowering means whereby the speed of oscillation of the pendulum will control the speed of lowering of the inlet of the decanting tube, a piston movable under pressure differences produced in said differential producer, and means connected to said piston and pendulum for varying the speed of oscillation of the pendulum by movement of the piston.

MERRILL P. ROBINSON.